B. W. & N. T. Renny,
Corn Plow.
No. 113,206. Patented Mar. 28, 1871.
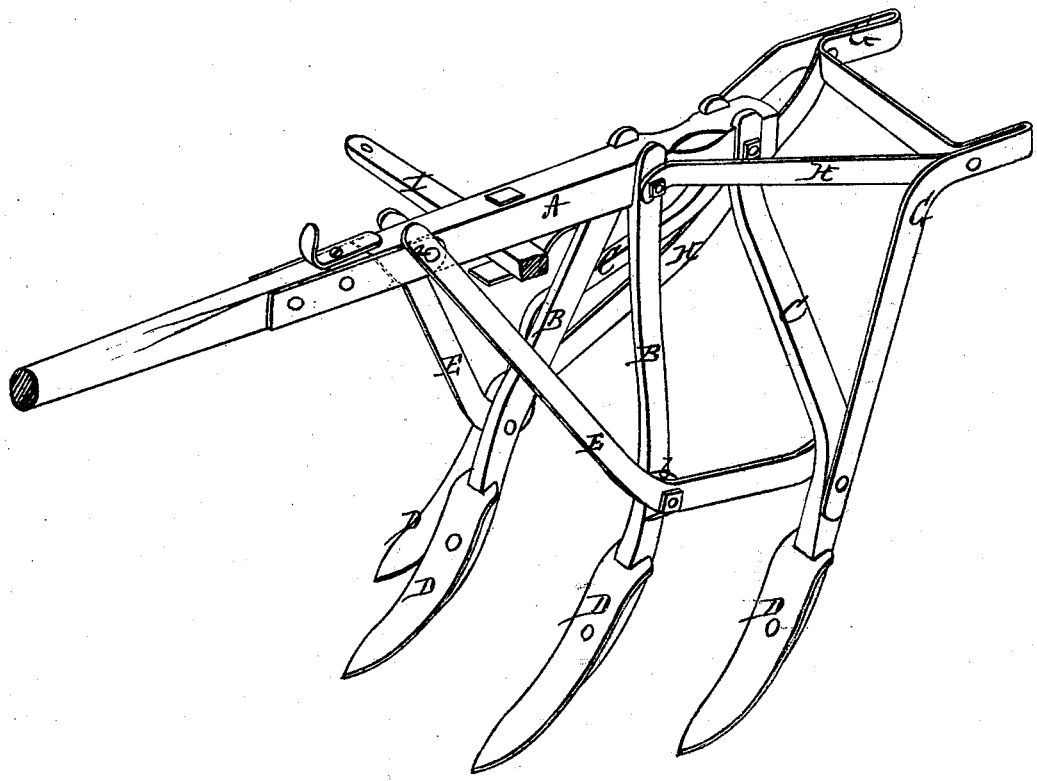
Witnesses.
Harry King
C. L. Evert
Inventor.
Benjamin W. Renny
Noah T. Renny
per
Alexander Mason
Atty.

UNITED STATES PATENT OFFICE.

BENJAMIN W. REMY AND NOAH T. REMY, OF BROOKVILLE, INDIANA.

IMPROVEMENT IN CORN-PLOWS.

Specification forming part of Letters Patent No. 113,206, dated March 28, 1871.

*To all whom it may concern:*

Be it known that we, BENJAMIN W. REMY and NOAH T. REMY, of Brookville, in the county of Franklin, and in the State of Indiana, have invented certain new and useful Improvements in Corn-Plows; and we do hereby declare that the following is a full, clear, and exact description thereof, reference being had to the accompanying drawing, and to the letters of reference marked thereon, making a part of this specification.

The nature of our invention consists in the construction and arrangement of a "corn-plow," as will be hereinafter fully set forth.

In order to enable others skilled in the art to which our invention appertains to make and use the same, we will now proceed to describe its construction and operation, referring to the annexed drawing, which represents a perspective view of our improved corn-plow.

A represents the plow beam or tongue, which is jointed at *a* for convenience' sake when the plow is not in use. On each side of the beam A, near its rear end, and at suitable distance apart, are attached the plow-shanks B C, each of which is provided with a plow-blade, D. The rear shank, C, on each side is bent outward, so that its plow will be in the rear and outside of the plow on the shank B. The two plows on each side of the beam are intended to run one on each side of a row, and thus one plow will operate on two rows at once. The shanks on each side of the beam are braced by means of a brace, E, as shown, and the inner shank, B, may be adjusted by the insertion of a block, *b*, between it and the said brace, and thus regulate the distance between the two plows on each side of the beam. The handles G G are attached, as shown, to rear end of the beam and the shank *c* on the left, and are braced by bars H H. The operator walks between the rows.

At a suitable point between the shanks B B and the front ends of the braces E E, on the under side of the beam A, is pivoted the double-tree I, to which the team is attached.

The depth at which the plows are to work is easily regulated by raising and lowering the neck-yoke.

Having thus fully described our invention, what we claim as new, and desire to secure by Letters Patent, is—

The combination of the beam A, shanks B C, plows D, handles G, braces E H, and double-tree I, all constructed and arranged substantially as and for the purposes herein set forth.

In testimony that we claim the foregoing we have hereunto set our hands this 3d day of August, 1870.

BENJAMIN W. REMY.
    NOAH T. REMY.

Witnesses:
 P. S. CASE,
 JOHN W. KEELY.